A. J. BURKE.
Grain Tally.
No. 58,593.
Patented Oct. 9, 1866.
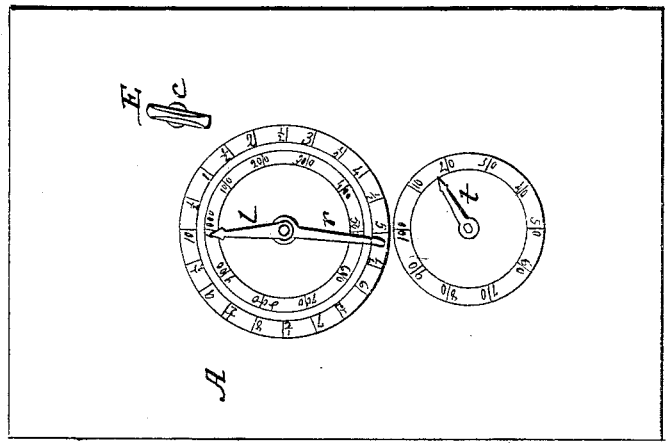
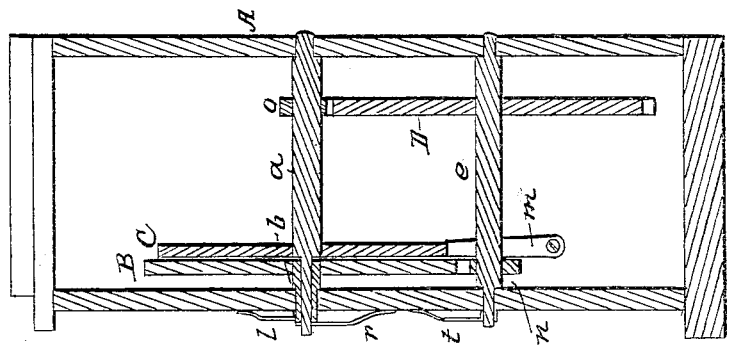
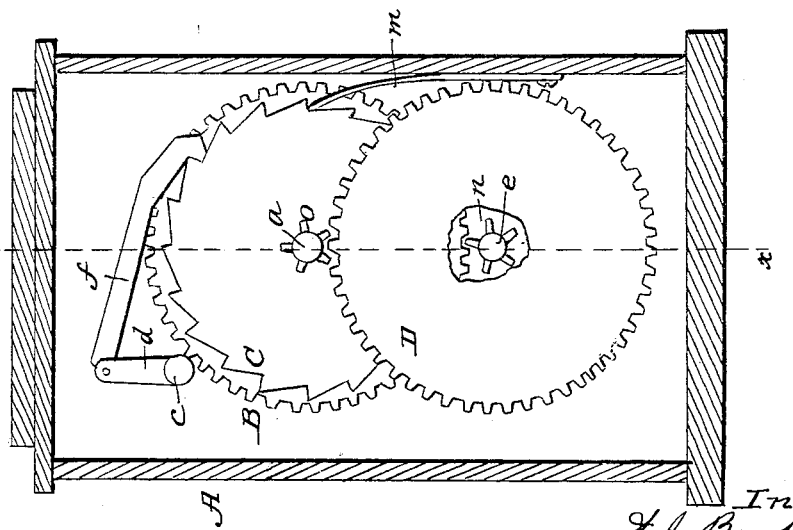

UNITED STATES PATENT OFFICE.

ANDREW J. BURKE, OF GRUNDY CENTRE, IOWA.

IMPROVEMENT IN TALLY-BOXES FOR MEASURING GRAIN.

Specification forming part of Letters Patent No. 58,593, dated October 9, 1866.

*To all whom it may concern:*

Be it known that I, ANDREW J. BURKE, of Grundy Centre, in the county of Grundy and State of Iowa, have invented certain new and useful Improvements in Registering-Instruments; and I do hereby declare that the following is a full, clear, and exact description thereof, reference being had to accompanying drawings, making part of this specification, and to the letters of reference marked thereon, like letters indicating like parts wherever they occur.

To enable others skilled in the art to construct and use the invention, I will proceed to describe it.

My invention consists in the arrangement of a clock-work to be operated by a pawl, with a series of indexes to register the quantity of grain thrashed by machines and measured by half bushels.

Figure 1 is a back-side elevation of the apparatus with the case removed. Fig. 2 is a transverse vertical section, taken on the line of $x$ $x$ of Fig. 1. Fig. 3 is a front view.

A represents the case, which may be of any suitable form and size. Within this case is mounted a shaft, $a$, having a ratchet-wheel, C, rigidly attached to it near its front end, while a pinion, $o$, is secured to its rear end, as shown in Fig 2.

Another shaft, $e$, is located directly under the shaft $a$, and on its rear portion is secured a wheel, D, which gears into the pinion $o$. Another and smaller wheel or pinion, $n$, is secured to the front portion of shaft $e$, and gears into a wheel, B, which is secured to a sleeve, $b$, fitted loosely on the front portion of shaft $a$, as shown in Fig. 2.

The shaft $e$ extends through the case at the front, and has a pointer or index, $t$, attached thereto.

The shaft $a$ has a similar index, marked $r$, secured to it, while still another index, $l$, is secured in a similar manner to the sleeve $b$.

A shaft, $c$, extends across the case parallel with the shafts $a$ and $e$, and inside of the case there is attached to it an arm, $d$, to the end of which is pivoted a pawl, $f$, so located as to engage in the teeth of the ratchet-wheel C, as shown in Fig. 1.

The shaft $c$ is provided on the outside of the case with a thumb-piece, E, for operating it, a spring, $h$, serving to throw the pawl back over another of the teeth of wheel C after it has been operated or moved forward by rotating the shaft $c$.

The ratchet-wheel is provided with twenty teeth, and the circle around which the hand $r$, attached to the same shaft with wheel C, moves is divided into twenty spaces, each space representing a half bushel, so that when the hand $r$ has made an entire revolution it indicates ten bushels, each movement of the hand indicating a half bushel, the circle being numbered to correspond, as shown in Fig. 3.

The pinion $o$ is provided with five teeth, while the wheel D, into which it gears, has fifty, so that at each revolution of the pinion $o$ the wheel D and its index $t$ will have made one-tenth of a revolution. Hence the circle for the index $t$ is divided into ten spaces, each representing two bushels, the spaces being numbered from ten to one hundred, accordingly, as shown in Fig. 3. In like manner, the pinion $n$, which drives the wheel B, makes ten revolutions to the latter's one; and hence the circle for the index $l$, which is attached to the sleeve of wheel B, is also divided into ten equal spaces, each representing one hundred bushels, so that when the index $l$ has made one revolution it will register one thousand, which is as many as there is occasion to measure or register at any one time.

To operate it, it is only necessary for the person who measures the grain to give the thumb-piece E a movement sufficient to operate the pawl $f$, by which the index or hand $r$ will be moved over one space, thus registering at each movement a half bushel, the other hands, of course, making their corresponding movements at the same time.

The box may be attached to the thrashing-machine at any convenient point, or it may be used detached, as may be most convenient, the intention, however, being to have it attached to the machine, and thus travel with it wherever the machine is used.

Having thus described my invention, what I claim is—

The arrangement of the ratchet-wheel C, operated by the pawl $f$ and provided with the index $r$, the pinion $o$, gearing into the wheel D on shaft $e$, the latter being provided with the index $t$, and the pinion $n$, operating the index $l$ by means of the wheel B, secured to the tubular shaft $i$, all operating as and for the purpose set forth.

A. J. BURKE.

Witnesses:
A. STILL,
A. F. WILLOUGHBY.